(12) United States Patent
Gibson et al.

(10) Patent No.: US 10,822,262 B2
(45) Date of Patent: *Nov. 3, 2020

(54) OPTICAL FIBERS WITH MULTIPLE OPENINGS FROM ADDITIVE MANUFACTURING

(71) Applicant: The Government of the United States of America, as represented by the Secretary of the Navy, Arlington, VA (US)

(72) Inventors: Daniel J. Gibson, Cheverly, MD (US); Rafael R. Gattass, Washington, DC (US); Daniel L. Rhonehouse, Chesapeake Beach, MD (US); Shyam S. Bayya, Ashburn, VA (US); L. Brandon Shaw, Woodbridge, VA (US); Jasbinder S. Sanghera, Ashburn, VA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/430,254

(22) Filed: Jun. 3, 2019

(65) Prior Publication Data
US 2019/0382298 A1 Dec. 19, 2019

Related U.S. Application Data

(63) Continuation of application No. 15/722,385, filed on Oct. 2, 2017, now Pat. No. 10,370,280.

(Continued)

(51) Int. Cl.
*G02B 6/04* (2006.01)
*C03B 17/04* (2006.01)
(Continued)

(52) U.S. Cl.
CPC .............. *C03B 17/04* (2013.01); *B29C 48/11* (2019.02); *B29C 48/30* (2019.02);
(Continued)

(58) Field of Classification Search
CPC . C03B 17/04; C03B 37/0279; C03B 2201/88; C03B 2203/42; C03B 2201/86;
(Continued)

(56) References Cited

U.S. PATENT DOCUMENTS

2010/0303429 A1* 12/2010 Gibson .............. G02B 6/02314
385/125
2010/0316856 A1* 12/2010 Currie ..................... B28B 3/269
428/213

* cited by examiner

Primary Examiner — Ellen E Kim
(74) Attorney, Agent, or Firm — US Naval Research Laboratory; Stephen T. Hunnius

(57) ABSTRACT

An optical fiber with multiple openings made from the steps comprising fabricating an extrusion die using at least one additive manufacturing technique such that the extrusion die has a first set of plurality of channels that combine inside the die into a second set of plurality of channels with a different set of shapes and sizes, extruding a glass through the extrusion die, forming a fiber optic preform having a plurality of longitudinal openings that run the entire length of the fiber optic preform, attaching a barrier layer to the fiber optic preform to form a series of channels to which pressure can be applied by a gas, wherein each channel has a pressure that is independently controlled, and stretching the fiber optic preform at an elevated temperature into an optical fiber with multiple openings.

14 Claims, 8 Drawing Sheets

Related U.S. Application Data

(60) Provisional application No. 62/403,377, filed on Oct. 3, 2016.

(51) Int. Cl.
*G02B 6/02* (2006.01)
*B29C 48/30* (2019.01)
*B29C 48/32* (2019.01)
*C03B 37/027* (2006.01)
*B29C 48/11* (2019.01)
*B29C 48/345* (2019.01)
B29C 48/09 (2019.01)
B29C 48/00 (2019.01)

(52) U.S. Cl.
CPC .......... *B29C 48/3003* (2019.02); *B29C 48/32* (2019.02); *B29C 48/345* (2019.02); *C03B 37/0279* (2013.01); *G02B 6/02042* (2013.01); *B29C 48/0018* (2019.02); *B29C 48/09* (2019.02); *C03B 2201/86* (2013.01); *C03B 2201/88* (2013.01); *C03B 2203/42* (2013.01); *G02B 6/02366* (2013.01)

(58) Field of Classification Search
CPC . B29C 47/0028; B29C 47/0852; B29C 47/30; B29C 47/20; B29C 47/0023; B29C 47/0057; G02B 6/02042
See application file for complete search history.

FIG. 2A  FIB. 2B

OPTICAL FIBERS WITH MULTIPLE OPENINGS FROM ADDITIVE MANUFACTURING

REFERENCE TO RELATED APPLICATION

This application is a non-provisional of, and claims priority to and the benefits of, U.S. patent application Ser. No. 62/403,377 filed on Oct. 3, 2016 and U.S. patent application Ser. No. 15/722,385 filed on Oct. 2, 2017, the entirety of each is hereby incorporated by reference.

BACKGROUND

This invention concerns glass optical fibers and optical fiber preforms having multiple holes or openings or voids running the entire length, and methods of making.

This disclosure also concerns an extrusion die with multiple joining channels manufactured by an additive manufacturing technique.

Optical fibers can be used to route light from one point to another, with losses that are dependent on the optical fiber design, material used and wavelength transmitted. The optical transmission window of materials is limited by a short wavelength edge, mostly due to electronic transitions, and a long wavelength edge, mostly due to multi-phonon transitions.

For different materials the transmission edges might lie in different ranges of the optical spectrum. The choice of fiber geometry and design affect the degree of overlap between the propagating light and the material.

A solid core fiber such as step index has a large modal overlap with the material, while hollow core photonic band gap fibers can have a small overlap. The impact of the combined limits from material loss and effective light guidance of a given fiber is to limit the range of wavelengths that can effectively be transmitted in the fiber.

The range of wavelengths that can be transmitted by solid core optical fibers are mainly limited by the material transmission. For example, silica based fibers being restricted to transmitting visible and shortwave infrared bands, while selenide-based fibers transmit part of the shortwave infrared band, the mid-infrared band and a part of the long-wave infrared band. Alternative fiber designs, where the light propagates in a hollow air core such as hollow-core photonic crystal fibers relax some of the wavelength transmission restrictions.

SUMMARY OF DISCLOSURE

Description

This disclosure concerns glass optical fibers and optical fiber preforms having multiple holes or openings or voids running the entire length, and methods of making.

This disclosure also concerns an extrusion die with multiple joining channels manufactured by an additive manufacturing technique.

This disclosure allows for the manufacture of microstructured optical fibers for laser power delivery and sensing applications, with high precision and rapid turnaround from fiber design to production.

DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings.

FIG. 2A illustrates a distal or exit end that has a plurality of openings.

FIG. 6 is a fiber optic preform made using the die and comprising an As—S based glass with 8 small openings of approximately the same size and circular transverse cross-sectional shape and 1 large central opening.

DETAILED DESCRIPTION OF THE INVENTION

Figure 1:
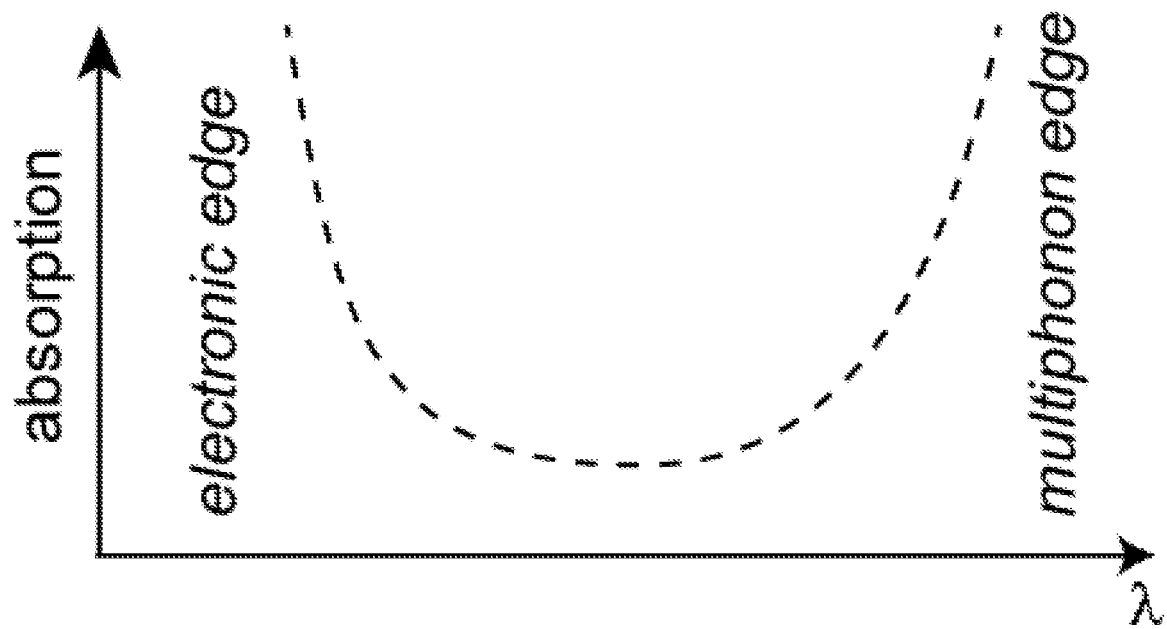
FIG. 1 illustrates absorption of materials as related to electronic transitions and to multi-phonon transitions.

This disclosure provides a method for the manufacture of glass optical fibers and optical fiber preforms having multiple holes or openings or voids running the entire length of the fiber or fiber preform such that these openings and the solid glass material disposed between them, and by virtue of the optical properties of the glass material and the material comprising the voids, typically air or an inert gas, as well as the geometry and dimensions of the voids and solid regions, light injected into a proximal end of the fiber is largely confined to a specific transverse region of the fiber and propagates through the longitudinal length of the fiber.

The method can include fabrication of an extrusion die, using at least one additive manufacturing technique such that the extrusion die has a plurality of channels that combine inside the die into a different plurality of channels with a different set of shapes and sizes, extruding a glass through the extrusion die to form a fiber optic preform having a plurality of longitudinal openings that run the entire length of the fiber optic preform, attaching a barrier layer to the extruded glass die to form a series of channels to which pressure can be applied by a gas and with each channel pressure independently controlled, and stretching the fiber optic preform at an elevated temperature into an optical fiber.

The optical fibers produced from this method are in the general category of microstructured optical fibers and can have properties of other fibers known in the art including photonic crystal fibers (PCF), photonic bandgap (PBG) fibers, inhibited coupling (also called frustrated or anti-resonant) fibers, multicore fibers and many others.

Microstructured optical fibers are optical fibers with "holes" running through their length.

The method allows for fibers with structured arrangement of holes that is not feasible, or otherwise cumbersome, using conventional techniques including tube-stacking and direct extrusion.

This invention also discloses the extrusion die with multiple joining channels manufactured by an additive manufacturing technique.

A 3D printed die of this invention has multiple entrances to accept softened glass into multiple flow channels. These flow channels reduce in cross sectional area along their length and combine to form features in the preform. The flow channels terminate in a common exit aperture.

The 3D printed die can be a single piece, with preform tolerances 10× better than the prior art. Furthermore, the printed die can be made 10× cheaper and 10× faster. Also, the "pins" do not flex during extrusion, which allows for precision along the preform length, superior to the prior art.

Multiple bands are present in the optical spectrum, with the ranges being roughly defined to certain wavelength ranges. The ultraviolet optical band (UV) is roughly defined as spanning optical wavelengths from 0.2-0.4 µm. The visible optical band (VIS) is roughly defined as spanning optical wavelengths from 0.4-0.8 µm. The shortwave infrared optical band (SWIR) is roughly defined as spanning optical wavelengths from 0.8-2 µm. The mid-infrared optical window (MWIR) is roughly defined as covering optical wavelengths from 2-5 µm. The long-wave infrared optical band (LWIR) is roughly defined as covering optical wavelengths 5-30 µm.

Effective light guidance is understood to be transmission through a fiber with losses typically below 10 dB/m for systems using between 1 and 10 meters of fiber, and typically below 100 dB/m for systems using less than 1 meter of fiber.

Chalcogenide optical fiber is fiber comprising primarily chalcogenide glass which contains at least one of the chalcogen elements (excluding oxygen, i.e. sulfur, selenium, and tellurium) along with other elements to form a glass network. Typically, these other elements include arsenic, germanium, gallium, indium, antimony, tin, bismuth, lead, thallium, lanthanum, aluminum but other elements may also be used. Halogen elements including fluorine, chlorine, bromine and iodine may be added in order to make chalcohalide glass and fibers. Chalcogenide and chalco-halide glasses are of a class of infrared (IR) transparent glasses. Arsenic sulfide, $As_2S_3$ and Arsenic Selenide $As_2Se_3$, Germanium Arsenic Sulfide and Germanium Arsenic Selenide are some specific examples of chalcogenide glass.

The fiber optic draw process is understood as a method whereby a fiber optic preform comprising one or more glass or polymer is held vertically by a motorized holder and introduced into the top opening of a furnace or oven having a cylindrical bore and heated to a softening temperature of the preform.

A fiber optic preform is typically a solid body comprising one or more glass or polymer materials, with a transverse cross sectional shape that is longitudinally invariant, or approximately so, and may contain one or more longitudinal openings. The transverse width or outer diameter of a preform is typically between 5 mm and 40 mm but may be larger or smaller, while the length of a typical preform is between 5 cm and 1 m but may be longer or shorter. Preforms typically have an aspect ratio (length/diameter or width) of between 10 and 100 but may be larger or smaller. The preform is softened and is pulled via a mechanical puller such as a capstan or drum, such that its outer diameter (or other cross sectional dimension) is reduced, typically by a factor of between 2 and 1000, forming an optical fiber with a transverse cross sectional shape approximately similar to that of the preform.

Optical fibers typically have a diameter or transverse width of between 10 µm and 300 µm but may be larger or smaller and continuous lengths of several meters to several kilometers are possible. In some cases, for example when the fiber is to have longitudinal openings, gas pressure (positive or negative gage pressure) may be applied to longitudinal openings in the preform during the draw.

Softening temperature is understood as the temperature under which the viscosity of the material is $10^{7.6}$ Poise. This temperature point is dependent on the material compositions being on the order of 1665° C. for silica, 820° C. for borosilicate glasses, and about 600° C. for germanate glasses. Chalcogenide, fluoride and telluride based IR-transmitting glasses have softening temperatures in the range of 160 to 600° C.

Additive manufacturing is a class of fabrication processes that builds a three-dimensional object from a source material typically one plane at a time, as opposed to conventional material removal machining. The process could involve the layer-by-layer bonding of materials such as metals, polymers or glasses. Typically the process allows for a computer generated three dimensional shape to be reproduced. Multiple methods are commonly used including but not limited to laser-sintering of powder or beads, stereolithography of polymers, fused deposition of hot extruded materials.

Additive manufacturing enables the fabrication of objects with intricate structures that cannot easily be fabricated using conventional tool-making processes including machining, injection molding and extrusion. For example, the object may contain internal passages or voids that are obscured by the object and therefore inaccessible to conventional cutting instruments. Three dimensional (3D) printing is another encompassing term used in the art to describe a class of additive manufacturing techniques.

Extrusion is a method to fabricate objects by forcing a material to flow through an extrusion die having an entrance side with one or more openings and an exit side with one or more openings. The opening(s) of the exit side impart a transverse cross sectional shape (commonly called an extrusion profile) to the material as it leaves the extrusion die. The process is capable of forming long continuous lengths of extruded objects with length invariant transverse shape using materials as diverse as metals, glasses, plastics and composites. The transverse shape or size may also vary along the object length by altering the shape of the extrusion die during the extrusion process or by changing the rate at which the object is removed from the extrusion die (commonly called draw-down).

Optical fibers can be used to route light from one point to another, with losses that are dependent on the optical fiber design, material used and wavelength transmitted. The optical transmission window of materials is limited by a short wavelength edge (mostly due to electronic transitions) and a long wavelength edge (mostly due to multi-phonon transitions) conceptually shown in FIG. 1.

For different materials the transmission edges might lie in different ranges of the optical spectrum. The choice of fiber geometry and design affect the degree of overlap between the propagating light and the material.

Figure 2:
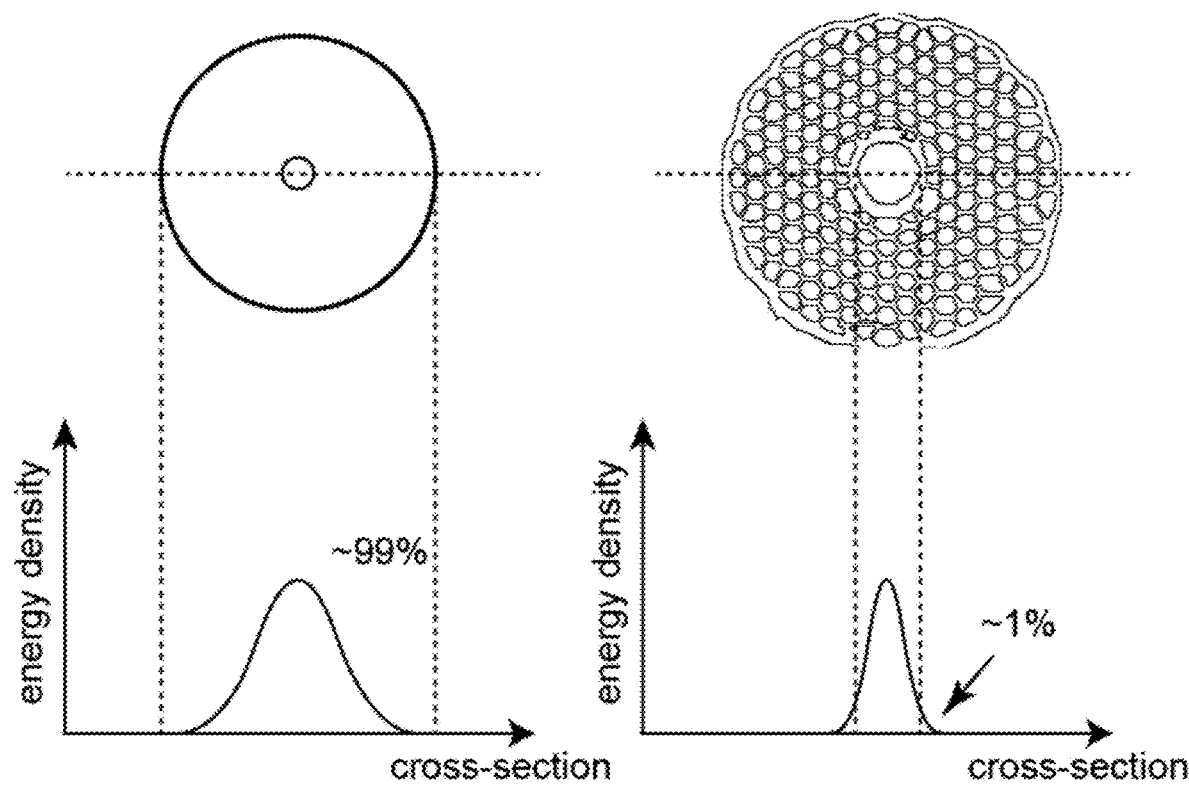
FIG. 2A illustrates a graph demonstrating energy density vs cross-section. For different materials the transmission edges might lie in different ranges of the optical spectrum. The choice of fiber geometry and design affect the degree of overlap between the propagating light and the material. A solid core fiber such as step index has a large modal overlap with the material.
FIG. 2B illustrates a graph demonstrating energy density vs cross-section. A hollow core photonic band gap fiber can have a small overlap.

Two examples are shown in FIG. 2, a solid core fiber such as step index has a large modal overlap with the material (FIG. 2A), while hollow core photonic band gap fibers can have a small overlap (FIG. 2B). The impact of the combined limits from material loss and effective light guidance of a given fiber is to limit the range of wavelengths that can effectively be transmitted in the fiber.

The range of wavelengths that can be transmitted by solid core optical fibers are mainly limited by the material transmission. For example, silica based fibers being restricted to transmitting visible and shortwave infrared bands, while selenide-based fibers transmit part of the shortwave infrared band, the mid-infrared band and a part of the long-wave infrared band. Alternative fiber designs, where the light propagates in a hollow air core such as hollow-core photonic crystal fibers relax some of the wavelength transmission restrictions.

Metal coated hollow core fibers are an alternative for light routing across multiple optical bands. However, the modal properties and bend loss sensitivity significantly restrict their applications.

An alternative fiber architecture has been developed, where the light propagates in a hollow center of the optical fiber with low losses even at wavelengths that the material used in the fiber would present significant attenuation. The fiber geometry is designed such that the light propagating in the center mode of these fibers cannot efficiently be coupled to the material or out of the fiber. These fibers are known by several names including inhibited coupling fibers or negative curvature fibers and are different from hollow-core photonic crystal fibers as they do not possess a photonic band in their density of propagating states, the geometric structure of the fiber effectively inhibits the coupling between central and other modes even though there are modes that would propagate with similar phase velocities. These fibers present multiple wide transmission bands with transmission losses on the order of $10^{-3}$ smaller than the material loss. This reduction in transmission loss expands the effective transmission range of these fibers to optical bands beyond those of the intrinsic material. Additionally, because the transmission mechanism is based on inhibited coupling, the dispersion (i.e. the degree of change in the effective propagation constant with respect to the wavelength) for these fibers is flatter than the ones displayed by hollow core photonic bandgap fibers at the edge of each band. Compared to metal coated hollow-core waveguides, inhibited coupling fibers can be designed to transmit light even when submitted to tight bends.

Figure 3:
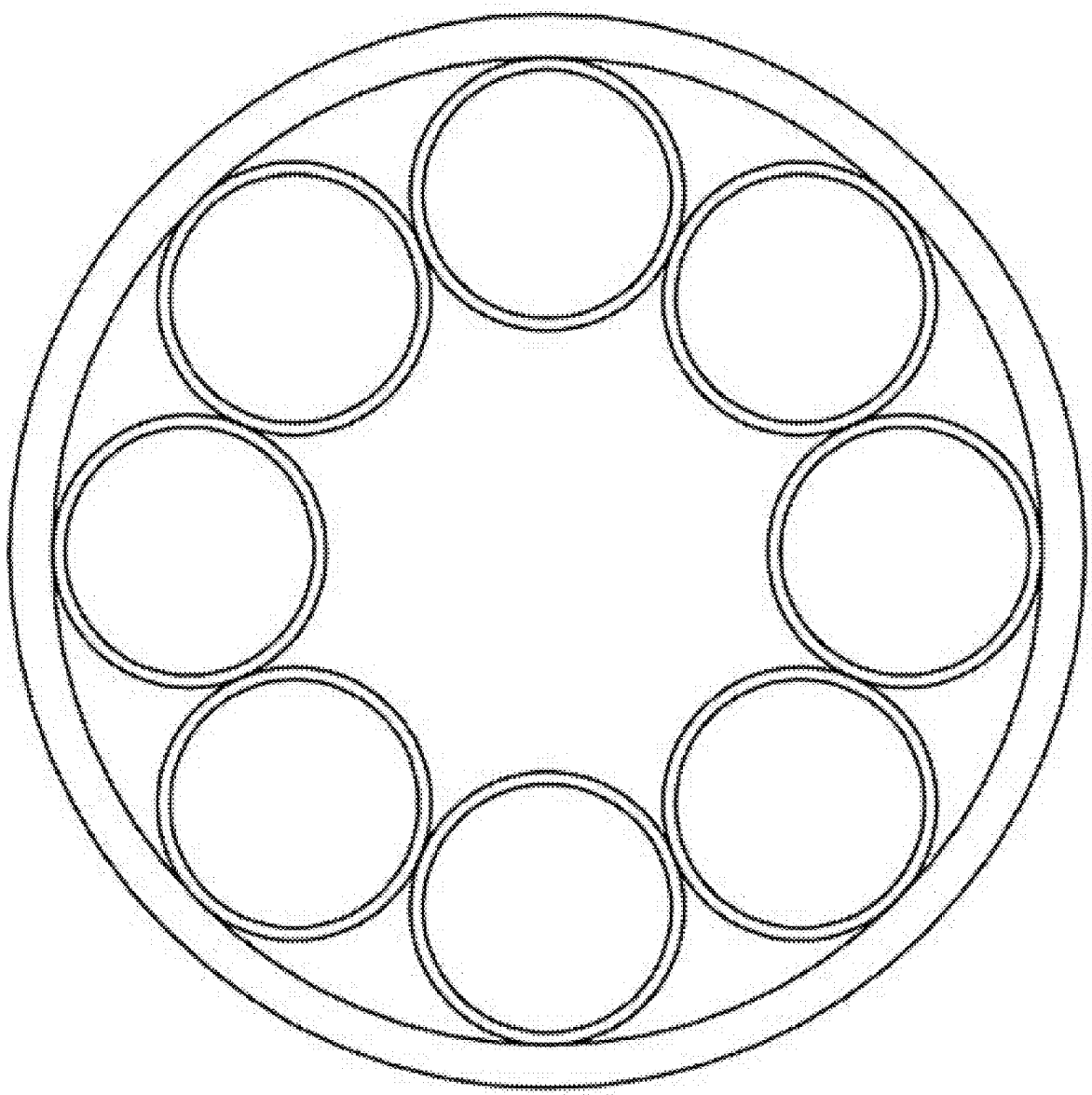
FIG. 3 illustrates a sample schematic of a known geometrical shape for these fibers. Methods for fabricating a structure similar to the one presented involve "stack and draw" methods, where a series of rods or tubes are stacked together, fused and then drawn down to form a fiber.

A sample schematic of a known geometrical shape for these fibers is shown in FIG. 3. Methods for fabricating a structure similar to the one presented in FIG. 3 involve "stack and draw" methods, where a series of rods or tubes are stacked together, fused and then drawn down to form a fiber. By its own nature, this process faces steep practical challenges for making arbitrary fiber architectures. The process faces additional challenges in bonding of the glasses after stacking.

Other fibers architectures can be drawn through extrusion utilizing two or more elements in a die. These multi-element dies utilize pins to constrict the material in the die and ensure openings remain in the fiber pre-form. The approach addresses challenges in making photonic crystal fibers with significant improvement over stack and draw as the voids between canes can be avoided. However, for making structures such as those in FIG. 3, the goal is to have very thin internal walls typically on the order of 0.1 to 10 µm. The process described in does not allow for the expansion of the holes to thin out the internal walls. Preforms and fibers resulting from the process are limited to geometrically simple extrusion profiles made by multi-element dies. Specifically the preforms have features limited in number and or precision of size, position or shape. This is due to the routing of glass material in the extrusion die being limited by the die geometry and features, including the tendency of the die pins to bend when they are long and thin, for example having an aspect ratio (length/diameter) greater than about 10, as the glass material is forced between them. A large aspect ratio is needed when the die has a long die land or finishing section as required to force glass to be routed from the periphery towards the center of the die.

A method where the glass could be introduced directly between the die pins would reduce the need for a long die land but is difficult to fabricate using conventional methods. Additional limitations are imposed when the required preform voids are shapes other than circular as die assembly becomes difficult or impossible.

Processing of non-silica glasses can present distinct challenges with respect to silica based glasses including the sharp viscosity dispersion with temperature, high vapor pressure and closely spaced softening points and crystallizations temperatures.

Extrusion processing of non-silicate glass compositions also displays unique challenges with respect to reactivity of the glass to the extrusion die material. The interaction of the hot glass with the die can lead to changing of the optical properties of the glass through the inclusion of impurities and short-lifetime of the die. These pose challenges in the selection of material and cost effectiveness of the process.

The method disclosed herein has many advantages and beneficial improvements over the current methods as it can use multiple materials for the formation of the die and can accomplish complex continuous shapes and channels such that the material can be routed with precision.

The currently described invention is superior to the prior art in several regards. For example, the prior art does not conceive of the use of an additive manufactured die, such that the long, flexible pins can be eliminated. The prior art does not address the use of multiple pressures to thin walls where needed. Additionally, the use of a two or more part die of the prior art is severely limiting in the fiber architectures that can be formed as well as the large cost with increased complexity.

The prior art method of manufacture of stack and draw technique and direct extrusion is limited in the fiber geometry as the stacked elements must necessarily touch each other. Features with sharp corners are difficult to produce from the prior art as the tubes tend to round when stretched prior to stacking. Direct extrusion methods of the prior art are very limited since the interior die channels of the current invention cannot be fabricated using conventional machining methods.

The currently disclosed invention enables manufacturing scale method for new microstructured optical fibers not possible using old techniques. It reduced development time for new designs, to 10× faster. Also, dies are 10× lower cost, using less hazardous waste.

These fibers have low loss, broadband transmission in MWIR and LWIR. For example, is 250× lower loss than solid fiber at 10 μm.

Additionally, this current invention provides for fiber geometries that are not possible with other methods.

The method of the present invention can include fabrication of an extrusion die, using at least one additive manufacturing technique such that the extrusion die has a plurality of channels that combine inside the die into a different plurality of channels with a different set of shapes and sizes, extruding a glass through the extrusion die to form a fiber optic preform having a plurality of longitudinal openings that run the entire length of the fiber optic preform, attaching a barrier layer to the extruded part such that multiple pressure zones can be formed in the channels of the preform, and stretching the fiber optic preform at an elevated temperature into an optical fiber.

Products of the present invention can include extrusion die comprising an additive manufactured material and having a proximal side having a plurality of openings and having a distal side having a plurality of openings. The openings of the proximal side are the beginnings of feed channels within the body of the die. Similarly the openings of the distal side are the endings of forming channels within the body of the die. Inside the body of the die, two or more of the feed channels combine with one or more forming channels.

The extrusion die where one or more of the openings on the distal side have an approximately annular transverse shape. The extrusion die where one or more of the openings on the distal side have a transverse shape comprising one or more sharp corners. Extrusion die where the material is a titanium alloy. Extrusion die where the material is a ceramic material. Extrusion die where the transverse cross-sectional area of a forming channel is smaller than the total transverse cross-sectional area of the feed channels connected to it. The extrusion step will involve softening the glass to reach a viscosity in the range of $10^{11}$ to $10^6$ Pa*sec, with preferred embodiment having range of $10^8$ to $10^{10}$. The stretching step will involve heating the material such that the viscosity of the material reaches $10^7$ to $10^3$ Pa*sec, with preferred embodiment of $10^5$ to $10^6$.

Each opening has a cross-sectional shape, cross sectional area and position within the transverse plane—all of which can be accurately controlled to a design using the method of the present invention. The optical fibers manufactured by this invention can have openings or holes that are periodically spaced in order to control the optical properties of the fibers, as is the case in photonic crystal fibers (PCF) or photonic bandgap (PBG) fibers. The openings in the fibers may have shapes and/or spacings that dictate certain electromagnetic modes of propagation within one or more transverse regions of the fiber, also called cores of the fiber, and preclude the existence cladding modes.

This invention can be used with any thermoplastic material including glasses, organic and inorganic polymers.

Example 1

Figure 4A:
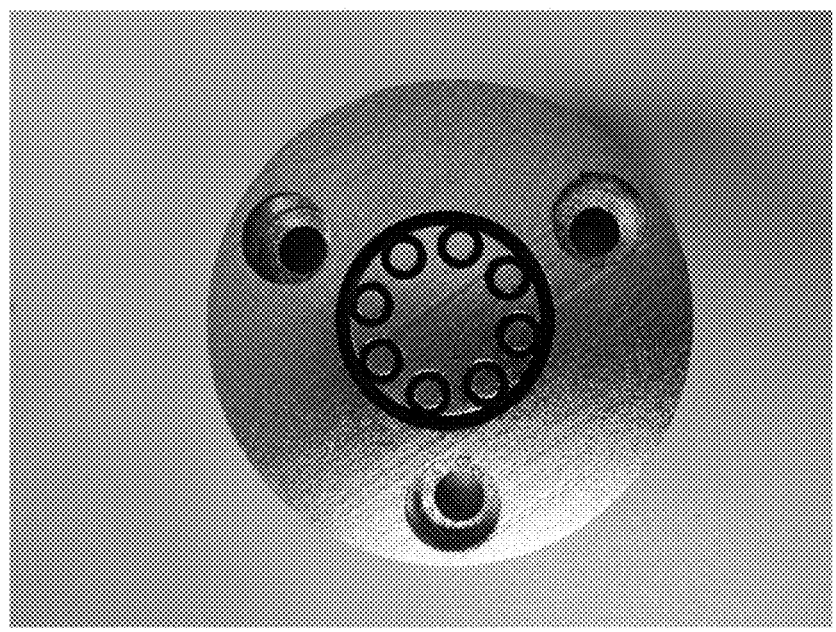
FIG. 4A illustrates extrusion die fabricated using additive manufacturing.
Figure 4B:
FIG. 4B illustrates extrusion die fabricated using additive manufacturing. A proximal or in-feed end has a plurality of openings with greater numbers and different transverse cross-sectional shapes.
Figure 5A:
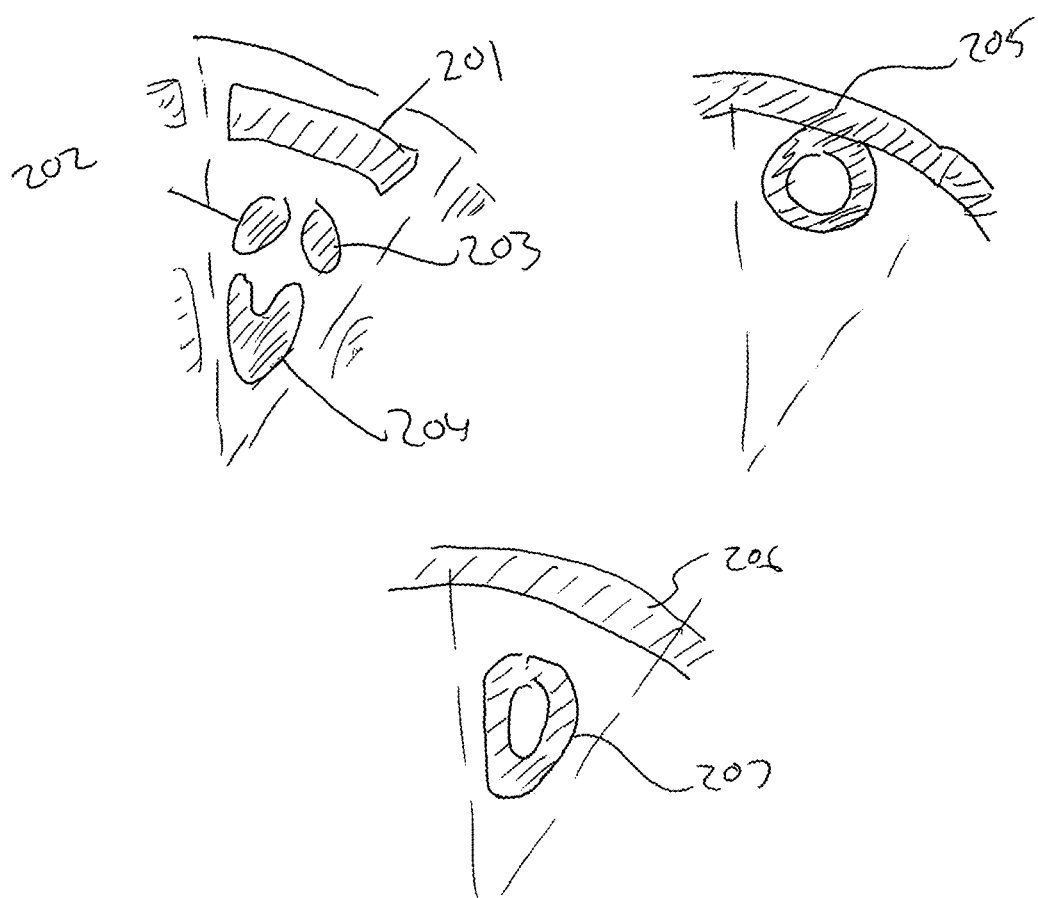
FIG. 5A illustrates typical 45° pie wedge illustrations of the openings within the extrusion die. Upper left shows the openings, 201, 202, 203 and 204, of the proximal or in-feed side of the die. Upper right shows the opening 205 of the distal or exit side of the die. Lower center shows the openings 206 and 207 at a plane internal to the die, approximately 5 mm from the distal face.
Figure 5B:
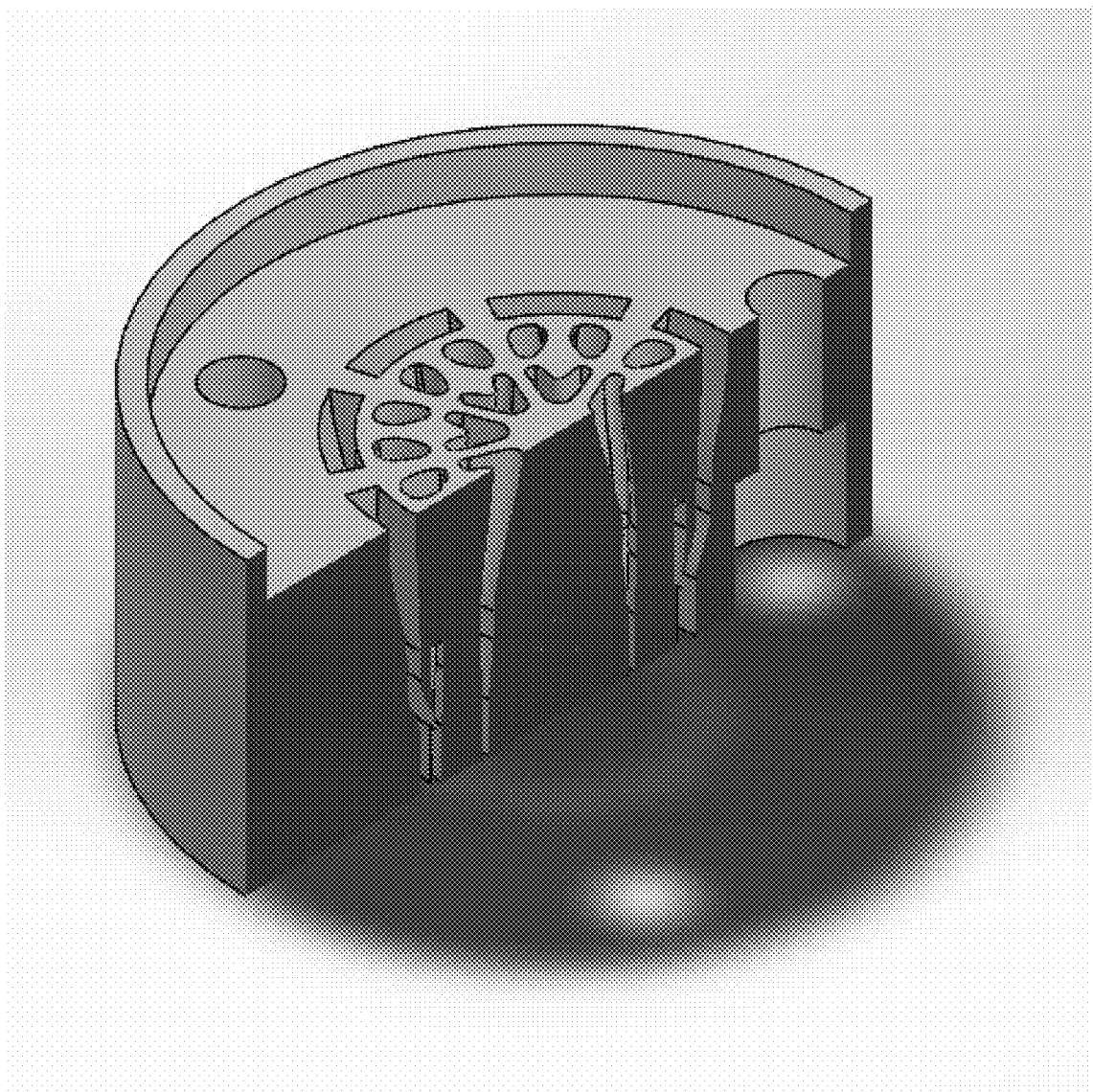
FIG. 5B illustrates a longitudinal cross-sectional view of the extrusion die showing the internal channels as they combine within the die. Note that not all channels are visible in this figure.

In example 1, the extrusion die was fabricated using an additive manufacturing technique. The die is made from a titanium alloy and has a distal or exit side (FIG. 4A) and a proximal or in-feed side (FIG. 4B). The proximal side has a plurality of openings, greater in number and transvers cross-sectional area than those of the distal side. During the extrusion step of the method, glass is heated to soften it to a viscosity between $10^{11}$ and $10^6$ Pa*sec and is introduced to the proximal side of the example die at a feed rate between 0.1 and 10 mm$^3$/min. FIG. 5 shows a 45° representative section (pie wedge) of the extrusion die at the proximal end, the distal end and at a plane inside the die and feed channels (201, 202, 203, 204) these features are repeated in all other 45° pie wedges of the die. The glass enters the openings and begins to flow through the feed channels (201, 202, 203, 204). Inside the die, the feed channels 202, 203 and 204 join together with the forming channel 207. As the glass flows from the feed channels to the forming channel, the separate streams of glass combine to form a single stream. This forms the beginning of a small tube in this example. The feed channel 201 joins with other feed channels in the other pie wedges (See FIG. 5B) to become the start of the forming channel 206. These glass streams join to form a large tube in this example. As the glass approaches the distal or exit end of the die, the forming channel 207 joins the forming channel 205. The small tube attaches to the large tube at this location. The glass exits the die at the distal end through the forming channel 205.

Example 2

Figure 6:
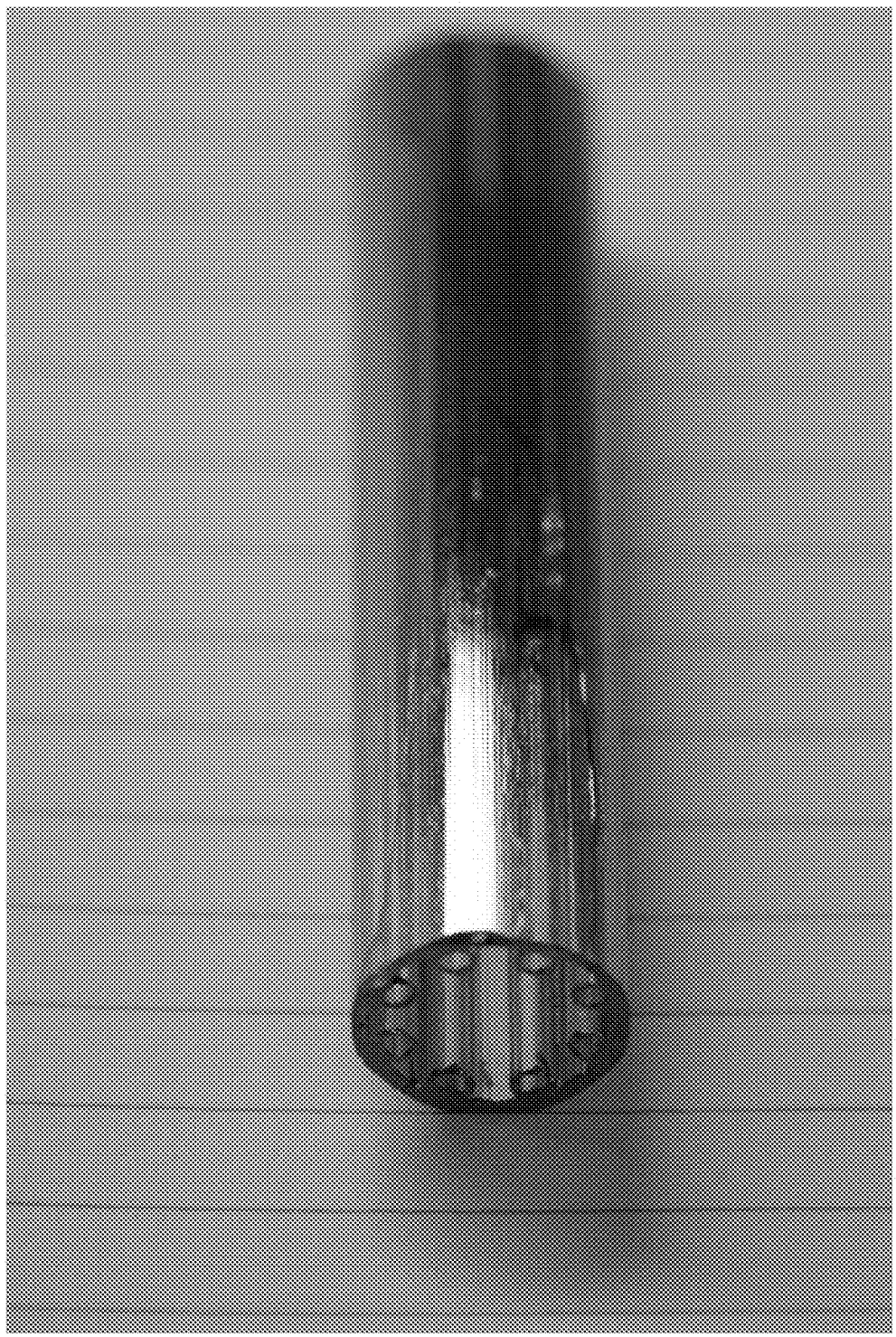
FIG. 6 illustrates a preform fabricated using the method of invention.

Example 2 is a fiber optic preform made using the die in example 1 and comprising an As—S based glass with 8 small openings of approximately the same size and circular transverse cross-sectional shape and 1 large central opening. FIG. 6 shows a photo of this preform. The outer diameter is about 18 mm. The small tubes have inner diameter of 1.9 mm and outer diameter of 2.6 mm and wall thickness of 0.35 mm. The total length is 135 mm.

Example 3

Figure 7:
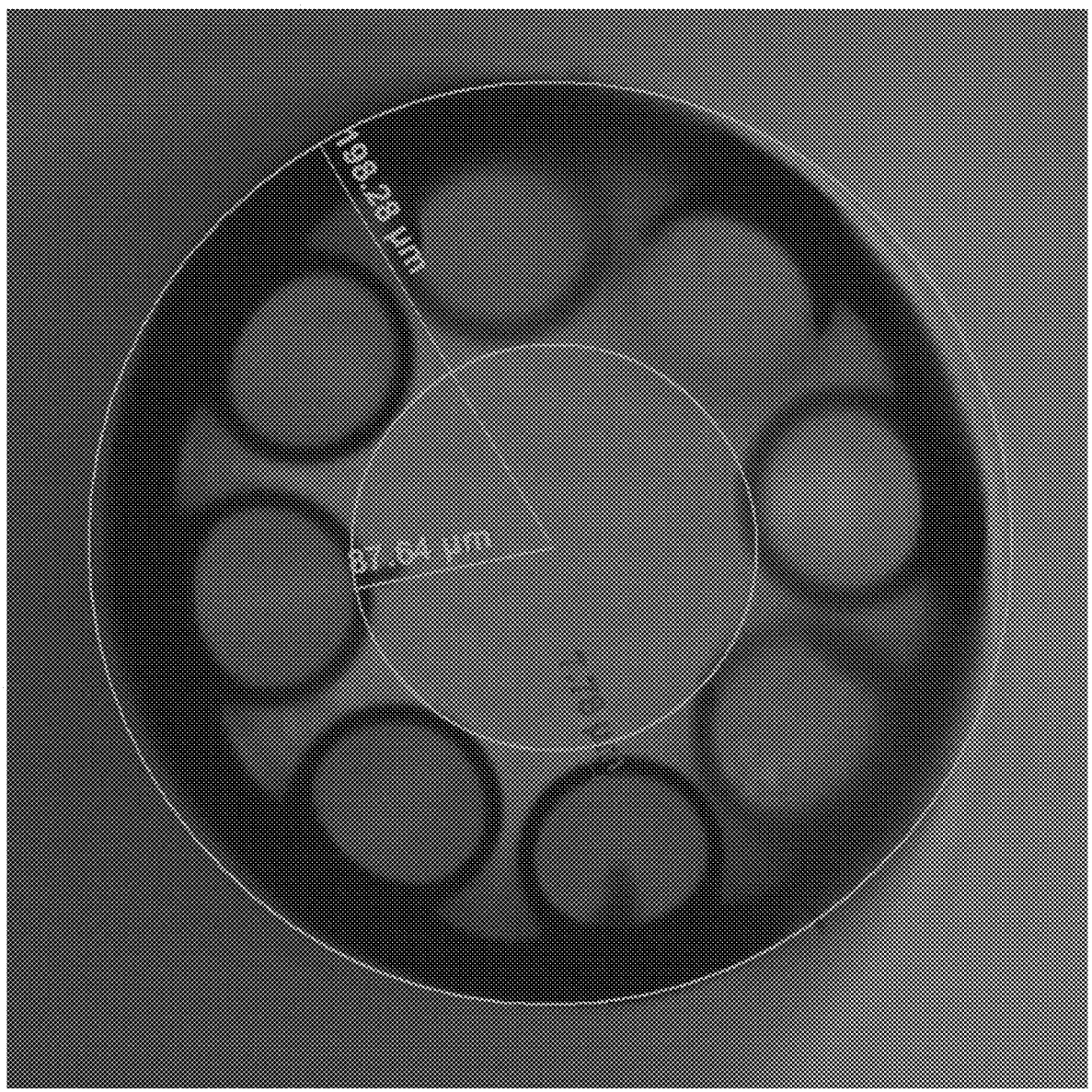
FIG. 7 illustrates an optical microscope image of a transverse end face of a fiber fabricated using the method and confocal microscope image of a transverse end face of another fiber fabricated using the method.

Example 3 is an optical fiber made using the preform in example 2 and comprising an As—S based glass with 8 small openings of approximately the same size and circular transverse cross-sectional shape and 1 large central opening. FIG. 7 shows a photo of this fiber. The outer diameter is about 200 μm. The small tubes have inner diameter of 70 μm and outer diameter of 83 μm and wall thickness of 6.5 μm. The total length is 2 m.

The currently disclosed invention enables manufacturing scale method for new microstructured optical fibers not possible using old techniques. It reduced development time for new designs, to 10× faster. Also, dies are 10× lower cost, using less hazardous waste.

These fibers have low loss, broadband transmission in MWIR and LWIR. For example, is 250× lower loss than solid fiber at 10 μm.

Additionally, this current invention provides for fiber geometries that are not possible with other methods.

This invention enables rapid continued progress in infrared optical fibers. Future Naval applications utilizing high-power IR lasers will benefit.

The above examples are merely illustrative of several possible embodiments of various aspects of the present disclosure, wherein equivalent alterations and/or modifications will occur to others skilled in the art upon reading and understanding this specification and the annexed drawings. In addition, although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

What we claim is:

1. An optical fiber with multiple openings made from the steps comprising:
    fabricating an extrusion die using at least one additive manufacturing technique such that the extrusion die has a first set of plurality of channels that combine inside the die into a second set of plurality of channels with a different set of shapes and sizes;
    extruding a glass through the extrusion die;
    forming a fiber optic preform having a plurality of longitudinal openings that run the entire length of the fiber optic preform;
    attaching a barrier layer to the fiber optic preform to form a series of channels to which pressure can be applied by a gas;
    wherein each channel has a pressure that is independently controlled; and
    stretching the fiber optic preform at an elevated temperature into an optical fiber with multiple openings.

2. The optical fiber with multiple openings of claim 1, wherein the step of extruding comprises softening the glass to reach a viscosity in the range of $10^{11}$ to $10^6$ Pa*sec.

3. The optical fiber with multiple openings of claim 1, wherein the step of extruding comprises softening the glass to reach a viscosity in the range of $10^8$ to $10^{10}$ Pa*sec.

4. The optical fiber with multiple openings of claim 1, wherein the step of stretching comprises heating the fiber optic preform such that the viscosity of the fiber optic preform reaches $10^7$ to $10^3$ Pa*sec.

5. The optical fiber with multiple openings of claim 1, wherein the step of stretching comprises heating the fiber optic preform such that the viscosity of the fiber optic preform reaches $10^5$ to $10^6$ Pa*sec.

6. An optical fiber with multiple openings made from the steps of:
    designing a fiber structure;
    designing and fabricating an extrusion die using additive manufacturing or three-dimensional (3D) printing;
    wherein the extrusion die has a first set of plurality of channels that combine inside the die into a second set of plurality of channels with a different set of shapes and sizes;
    wherein each channel has a pressure that is independently controlled;
    extruding a preform from an IR-transparent glass from the additive-manufactured die; and
    stretching the preform into an optical fiber with multiple openings.

7. The optical fiber with multiple openings of claim 6 wherein the IR-transparent glass is softened.

8. The optical fiber with multiple openings of claim 6, further comprising the steps of:
    heating the IR-transparent glass prior to the step of extruding a preform, wherein said heating the IR-transparent glass comprising heating to a temperature of about 350° C. for about 10 hours.

9. The optical fiber with multiple openings of claim 6, wherein the step of extruding comprises softening the glass to reach a viscosity in the range of $10^{11}$ to $10^6$ Pa*sec.

10. The method of making an optical fiber with multiple openings of claim 6, wherein the step of stretching comprises heating the fiber optic preform such that the viscosity of the fiber optic preform reaches $10^7$ to $10^3$ Pa*sec.

11. An extrusion die comprising an additive manufactured material and having a proximal side having a first set of plurality of openings and having a distal side having a second set of plurality of openings;
    wherein the openings of the proximal side are the beginnings of feed channels within the body of the die;
    wherein each channel has a pressure that is independently controlled;
    wherein the openings of the distal side are the endings of forming channels within the body of the die; and
    wherein inside the body of the die, two or more of the feed channels combine with one or more of the forming channels.

12. The extrusion die of claim 11 wherein one or more of the openings of the distal side have an approximately annular transverse shape.

13. The extrusion die of claim 12 wherein one or more of the openings on the distal side have a transverse shape comprising one or more sharp corners and wherein the material comprises either a titanium alloy or a ceramic material.

14. The extrusion die of claim 13 wherein the transverse cross-sectional area of a forming channel is smaller than the total transverse cross-sectional area of the feed channels connected thereto.

* * * * *